United States Patent
Stroiescu et al.

(10) Patent No.: US 10,989,817 B2
(45) Date of Patent: Apr. 27, 2021

(54) ENHANCED UWB AND GNSS POSITION MEASUREMENT SYSTEM

(71) Applicant: Statsports Group Limited, Newry (GB)

(72) Inventors: Florin Stroiescu, Dublin (IE); Alan Clarke, Bessbrook (GB); Sean O'Connor, Bellurgan (IE); Valeriu Emanuel Ionita, Drogheda (IE)

(73) Assignee: STATSPORTS GROUP LIMITED, Newry (GB)

( * ) Notice: Subject to any disclaimer, the term of this patent is extended or adjusted under 35 U.S.C. 154(b) by 221 days.

(21) Appl. No.: 16/090,995

(22) PCT Filed: Mar. 31, 2017

(86) PCT No.: PCT/GB2017/000048
§ 371 (c)(1),
(2) Date: Oct. 3, 2018

(87) PCT Pub. No.: WO2017/174956
PCT Pub. Date: Oct. 12, 2017

(65) Prior Publication Data
US 2019/0113631 A1    Apr. 18, 2019

(30) Foreign Application Priority Data

Apr. 5, 2016  (GB) ...................... 1605799

(51) Int. Cl.
*G01S 19/49*     (2010.01)
*G01S 19/10*     (2010.01)
(Continued)

(52) U.S. Cl.
CPC .......... *G01S 19/49* (2013.01); *G01S 13/0209* (2013.01); *G01S 19/10* (2013.01); *G01S 19/19* (2013.01);
(Continued)

(58) Field of Classification Search
CPC .... G01S 19/49; G01S 19/396; G01S 13/0209; G01S 19/10; G01S 19/19; G01S 19/39; G01S 19/48; G01S 19/51
See application file for complete search history.

(56) References Cited

U.S. PATENT DOCUMENTS 5,495,416 A * 2/1996 Buchwitz ............... G01C 21/00
                                                          701/484
9,140,772 B1   9/2015 Dewberry et al.
(Continued)

FOREIGN PATENT DOCUMENTS

CN       105891867 A    8/2016

OTHER PUBLICATIONS

M. Tanigawa, J. D. Hol, F. Dijkstra, H. Luinge and P. Slycke, "Augmentation of low-cost GPS/MEMS INS with UWB positioning system for seamless outdoor/indoor positioning", Proc. ION GNSS, vol. 4, pp. 1-8, 2004. (Year: 2004).*
(Continued)

*Primary Examiner* — Angelina Shudy
(74) *Attorney, Agent, or Firm* — Faegre Drinker Biddle & Reath LLP

(57) ABSTRACT

A system for measuring the position of one or more object in an area of interest. The system has an ultra wideband position measurement system with a plurality of beacons which are each located in separate fixed positions with respect to the area of interest; and one or more portable tag which is attachable to the object and a Global Navigation Satellite System (GNSS). The portable tag has an ultrawideband receiver which receives UWB data for determining the UWB position of the portable tag with reference to the primary and secondary beacons, a GNSS receiver which receives GNSS data for determining the GNSS position of the portable tag with reference to GNSS system satellites, a kinematics module which creates kinematic data to deter-
(Continued)

UWB positioning system mine movement of the tag based upon kinematic changes in the tag, a processor which comprises, a data augmentation module which calculates position data which represents the most accurate position for the portable tag based upon the UWB position, the GNSS position and the movement of the tag as calculated by the kinematics module.

20 Claims, 3 Drawing Sheets

(51) Int. Cl.
*G01S 19/48* (2010.01)
*G01S 19/39* (2010.01)
*G01S 19/19* (2010.01)
*G01S 13/02* (2006.01)
*G01S 19/51* (2010.01)

(52) U.S. Cl.
CPC ............ *G01S 19/39* (2013.01); *G01S 19/396* (2019.08); *G01S 19/48* (2013.01); *G01S 19/51* (2013.01)

(56) References Cited

U.S. PATENT DOCUMENTS

| | | | |
|---|---|---|---|
| 9,677,898 B2* | 6/2017 | Ko | G01C 21/3602 |
| 2002/0156556 A1 | 10/2002 | Ruffner | |
| 2003/0182053 A1 | 9/2003 | Swope et al. | |
| 2004/0006424 A1* | 1/2004 | Joyce | G01S 19/19 701/408 |
| 2005/0001720 A1* | 1/2005 | Mason | G01S 5/0072 340/539.13 |
| 2006/0262007 A1* | 11/2006 | Bonthron | G01S 13/44 342/70 |
| 2009/0076835 A1* | 3/2009 | Carter | G01S 5/0027 705/305 |
| 2010/0066587 A1* | 3/2010 | Yamauchi | G05D 1/0274 342/70 |
| 2011/0051608 A1* | 3/2011 | Lee | H04W 64/00 370/252 |
| 2014/0050362 A1* | 2/2014 | Park | G01C 21/30 382/104 |
| 2014/0269491 A1* | 9/2014 | Edge | H04W 40/24 370/328 |
| 2014/0292568 A1* | 10/2014 | Fleming | G01S 5/0226 342/357.31 |
| 2014/0358840 A1* | 12/2014 | Tadic | B60R 21/0136 706/52 |
| 2015/0278614 A1* | 10/2015 | Lee | G02B 27/01 348/148 |
| 2016/0266234 A1* | 9/2016 | Pearce | G01S 17/86 |
| 2016/0313450 A1* | 10/2016 | Jordan | G01S 19/40 |
| 2017/0005958 A1* | 1/2017 | Frenkel | H04L 51/046 |
| 2017/0289951 A1* | 10/2017 | Dey | G01S 5/0263 |
| 2017/0357006 A1* | 12/2017 | Ohrlund | G05D 1/0272 |
| 2018/0038694 A1* | 2/2018 | Bruemmer | G01S 13/0209 |
| 2018/0045807 A1* | 2/2018 | Senna | G01S 1/024 |
| 2018/0213717 A1* | 8/2018 | Jagenstedt | G05D 1/0274 |
| 2018/0343397 A1* | 11/2018 | Chandrashekar | G01S 5/0263 |
| 2019/0043328 A1* | 2/2019 | Thomas | G06K 7/10009 |
| 2019/0128995 A1* | 5/2019 | Stroiescu | G01S 5/0273 |
| 2019/0170845 A1* | 6/2019 | Stroiescu | G01S 1/024 |
| 2019/0206093 A1* | 7/2019 | Chen | G06T 11/00 |
| 2019/0383630 A1* | 12/2019 | Lee | G08G 1/0968 |
| 2020/0049836 A1* | 2/2020 | Taber | G01S 13/878 |
| 2020/0228943 A1* | 7/2020 | Martin | G09B 19/0038 |
| 2020/0241917 A1* | 7/2020 | Chen | G06F 9/4881 |
| 2020/0246661 A1* | 8/2020 | Husemeyer | H04W 4/025 |

OTHER PUBLICATIONS

International Search Report for PCT/GB2017/000048 dated Jul. 21, 2017, 5 pages.
International Written Opinion for PCT/GB2017/000048 dated Jul. 21, 2017, 10 pages.

* cited by examiner

GPS - UWB augmentation system

UWB positioning system

GNSS-UWG data augmentation process

ENHANCED UWB AND GNSS POSITION MEASUREMENT SYSTEM

INTRODUCTION

The present invention relates to a method and apparatus for real time measurement of the position of one or more device and in particular, but not exclusively, to the measurement of the position and movement of individuals participating in an activity such as a team sport.

BACKGROUND TO THE INVENTION

A common method of determining the positioning of one device in outdoor environment is using a Global Navigation Satellite System (GNSS). Many such systems are used around the world including: GPS, a US GNSS system; BEIDOU, a Chinese GNSS system, GALILEO, an EU GNSS system and GLONASS a Russian GNSS system).

GNSS is a space-based navigation system that provides location and time information in all weather conditions, anywhere on or near the Earth where there is an unobstructed line of sight to four or more GNSS satellites. This technology enables the device to determine its own latitude, longitude, altitude, velocity and heading, together with some other positional characteristics, and accurate time information. The GNSS systems are using a version of triangulation to locate the device, involving the information received from a number of satellites. The information received from the satellites contains precisely time coded data, transmitted at precise moments. Using this information, and pre-stored information about the exact position of the satellites, any receiver in the coverage area can calculate its own position.

Accurate position detection indoors requires an alternative approach because the satellites have no direct line of sight. An alternative to GNSS, which may be used indoors uses local beacons that have been precisely placed and need to have very high precision clocks to provide the required level of positional accuracy. In some cases, expensive time-of-flight based devices, using extremely precise timing circuits are used. However, these are hard to maintain and difficult to operate.

The alternatives to GNSS for indoor environments based on mapping and surveying techniques for wireless signals (Skyhook4, Wifarer 5, Google6), Ultra-Wide Band (UWB) networks based on time-of-flight (ToF) and time-difference-of-arrival (TDoA) techniques (Decawave, StatSports). The Decawave7 system uses wireless sensors networks in ultra-wide-band radio frequency range and needs to maintain the network mesh at all times.

Dead-reckoning involves using a previously determined position or fix and calculating the current position using information on speed and direction of travel such as would be provided using accelerometers and gyroscopes, optical techniques such as the use of Light Emitting Diodes (Bytelight).

The Bytelight, system is a retail solution which works by locating shoppers and offering up timely info on the back of an awareness of their proximity to the beacon; such systems require a perfect line of sight for their successful operation.

Other environments are characterised by sporadic or intermittent availability of a GNSS signal. These are known as mixed environments, for example urban areas with "urban canyons" between high buildings, or semi-closed areas like stadiums. Mixed environments can make GNSS unreliable, as the line of sight to some of the satellites is obstructed.

There are many situations where the real time precise measurement of the position of objects or persons is needed, such as in team and individual sports, inventory location, construction sites, security, surveying, and many others. In team sports, for example, the position and movement of individual players in the context of the team and the opposing team can provide valuable information on player and team performance. Other data such as player speed, distance covered, acceleration and player position is also very valuable. Obtaining this data requires the creation of highly accurate and reliable systems for measuring player position and movement.

SUMMARY OF THE INVENTION

One object of the invention is to provided a system and method which uses indoor technologies in order to complement and compensate for the inaccuracies of GNSS in order to get more precise positioning information.

Another object of the invention is to provide a system and method uses GNSS and UWB technologies in order to complement and compensate for the inaccuracies of GNSS in order to get more precise positioning information.

In another aspect of the invention a kinematic technique is used to complement and compensate for the inaccuracies of GNSS in order to get more precise positioning information.

In accordance with a first aspect of the invention there is provided a system for measuring the position of one or more object in an area of interest, the system comprising:
  an ultra wideband position measurement system comprising
    a plurality of beacons which are each located in separate fixed positions with respect to the area of interest; and
    one or more portable tag which is attachable to the object; and
  a Global Navigation Satellite System (GNSS);
  wherein the portable tag comprises:
    an ultrawideband receiver which receives UWB data for determining the UWB position of the portable tag with reference to the primary and secondary beacons;
    a GNSS receiver which receives GNSS data for determining the GNSS position of the portable tag with reference to GNSS system satellites;
    a kinematics module which creates kinematic data to determine movement of the tag based upon kinematic changes in the tag
    a processor which comprises, a data augmentation module which calculates position data which represents the most accurate position for the portable tag based upon the UWB position, the GNSS position and the movement of the tag as calculated by the kinematics module.

Preferably, the data augmentation module comprises an algorithm which:
  receives GNSS data, UWB data or no data,
  checks the data integrity and
  validates the GNSS Data using UWB data and kinematics data or
  validates the UWB data using Kinematics data
  and where no data is received, uses previous valid position data and kinematic data such that in each case, position data which represents the most accurate position of the portable tag is calculated.

Preferably, the data integrity check comprises one or more of
  checks against integrated error correction checksum, validity and credibility checks against the previously validated data extrapolated with the dead-reckoning data computed using the kinematics sensor information.

Preferably, the data augmentation module receives UWB or GNSS data

Preferably, the processor which has the data augmentation module is a microcontroller which calculates the UWB position of the portable tag.

Optionally, the processor which has the data augmentation module is a microcontroller which calculates the GNSS position of the portable tag.

Optionally, the processor which has the data augmentation module comprises a microcontroller which calculates the UWB position of the portable tag and which calculates the GNSS position of the portable tag.

Preferably, the position data is communicated in binary or ASCII form to a host system represented by a device that uses the position data and auxiliary data provided by the data augmentation module.

Preferably the host provides management and supply to the data augmentation module.

Preferably, the management and supply comprises functions such as start, stop, reset, and the power supply functions, such as standard power during functioning, backup power during stand-by.

Preferably, the host comprises, a micro-controller, a computer, or a storage system.

In some embodiments the position data can be transmitted as NMEA (National Marine Electronics Association) sentences, identical to the sentences generated by a GNSS module, such as the device can directly replace a GNSS module but provide more accurate and reliable data.

Preferably, the ultra wideband position measurement system comprising a primary beacon located at a first fixed position in or near the area of interest two or more secondary beacons located at different fixed positions in or near the area of interest.

Preferably, the kinematics module provides kinematics data that defines the short term position of the device.

Preferably, the kinematics module comprises a combination of 3 axes accelerometer, 3 axes gyroscope, and 3 axes magnetometer.

Advantageously, the present invention uses both GNSS and UWB positioning technologies, in order to achieve better performance and reliability for the positioning system.

In accordance with a second aspect of the invention there is provided a method for measuring the position of one or more object in an area of interest, the object being attached to a portable tag, the method comprising the steps of:

Creating UWB position data which is a measure of the position of the portable tag using an ultra wideband position measurement system Creating GNSS data which is a measure of the position of the portable tag using a global navigation satellite system;

Creating kinematic data which is a measure of the change in position of the portable tag calculating position data which represents the most accurate position for the portable tag based upon the UWB position data, the GNSS position data and the kinematic data.

Preferably, the step of calculating position data comprises:
 receiving GNSS data, UWB data or no data,
 checking the data integrity and
 validating the GNSS Data using UWB data and kinematics data or
 validating the UWB data using Kinematics data and where no data is received, uses previous valid position data and kinematic data such that in each case, position data which represents the most accurate position of the portable tag is calculated.

Preferably, the data integrity check comprises one or more of
 checks against integrated error correction checksum,
 validity and credibility checks against the previously validated data extrapolated with the dead-reckoning data computed using the kinematics sensor information.

Preferably, the data augmentation module receives UWB or GNSS data

Preferably, the processor which has the data augmentation module is a microcontroller which calculates the UWB position of the portable tag.

Optionally, the processor which has the data augmentation module is a microcontroller which calculates the GNSS position of the portable tag.

Optionally, the processor which has the data augmentation module comprises a microcontroller which calculates the UWB position of the portable tag and which calculates the GNSS position of the portable tag.

Preferably, the position data is communicated in binary or ASCII form to a host system represented by a device that needs the position data and auxiliary data provided by the data augmentation module.

Preferably the host provides management and supply to the data augmentation module.

Preferably, the management and supply comprises functions such as start, stop, reset, and the power supply functions, such as standard power during functioning, backup power during stand-by.

Preferably, the host comprises, a micro-controller, a computer, or a storage system.

In some embodiments the position data can be transmitted as NMEA sentences, identical to the sentences generated by a GNSS module, such as the device can directly replace a GNSS module but provide more accurate and reliable data.

Preferably, the kinematics data defines the short term position of the device.

Advantageously, the present invention uses both GNSS and UWB positioning technologies, in order to achieve better performance and reliability for the positioning is system.

In accordance with a third aspect of the invention there is provided a computer program having program instructions for carrying out the method of the second aspect of the invention.

In accordance with a fourth aspect of the invention there is provided a portable tag for use in the system of the first aspect of the present invention and as defined therein.

BRIEF DESCRIPTION OF THE DRAWINGS

The present invention will now be described with reference to the accompanying drawings in which.

DETAILED DESCRIPTION OF THE DRAWINGS

The present application describes a device that uses both GNSS and UWB (Ultra-Wide Band) positioning technologies, in order to achieve better performance and reliability for the positioning system. The UWB positioning system used in the following embodiment of the invention is described in patent application GB1605186.4. That UWB system may be replaced with any other UWB indoor positioning system.

The system and method of the present invention are designed to improve the accuracy of UWB and GNSS position measurements.

Figure 3:
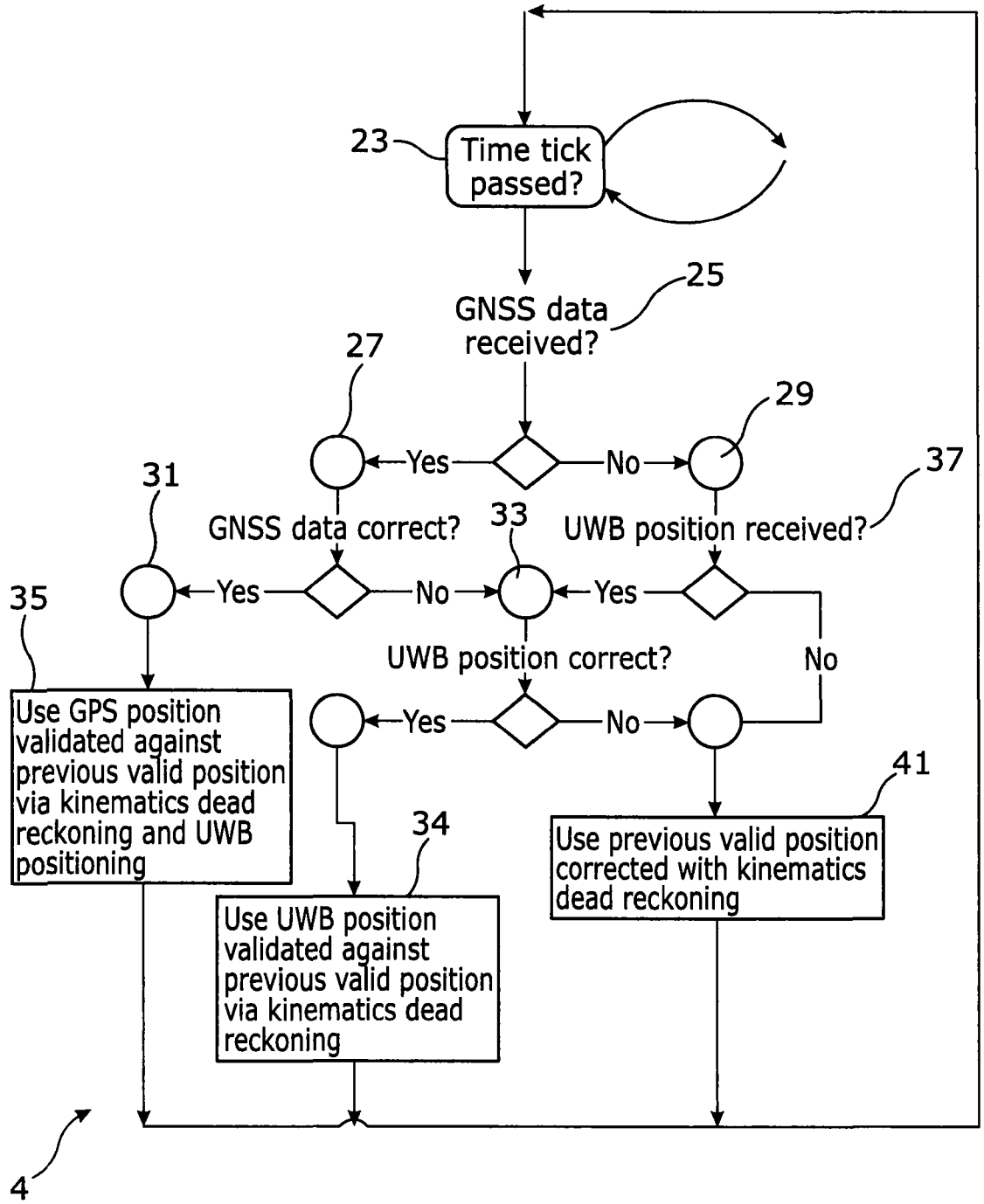
FIG. 3 is a flow diagram which illustrates an example of a method in accordance with the present invention.

The process used to achieve the improvements claimed in the present invention is known as data augmentation. In this case, it represents the correction of the positional data using both positional GNSS and UWB systems, in order to obtain higher accuracy and reliability for the positional data. The data received from the GNSS receiver is compared to the data received previously from the GNSS system data, with the positional data from the UWB positioning system, and with the inertial data from the kinematics module, and the best position candidate is calculated as shown in FIG. 3.

The data is then communicated in binary or ASCII form to the host system represented by a device that needs the positional and auxiliary data provided by the augmentation device, and preferably provides the management and supply functions needed by the augmentation device. The host can be, but not limited to, a micro-controller, a computer, or a storage system. In some embodiments the augmented data can be transmitted as NMEA (National Marine Electronics Association) sentences, identical to the sentences generated by a GNSS module, such as the device can directly replace a GNSS module but provide more accurate and reliable data.

Figure 1:
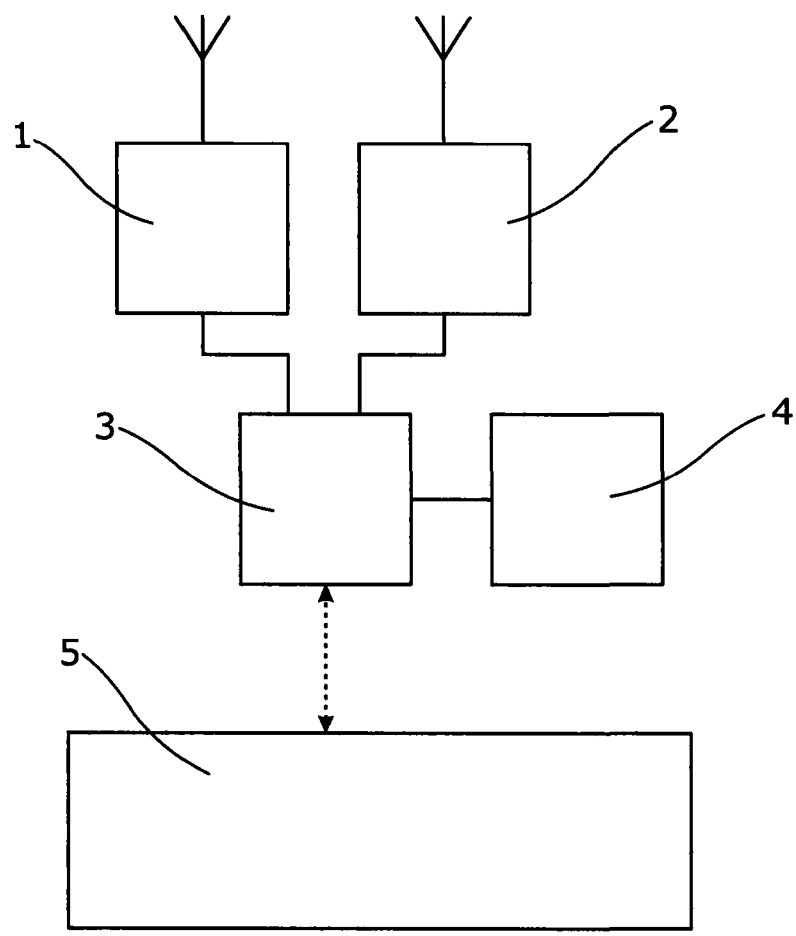
FIG. 1 is a schematic diagram of a first embodiment of a device in accordance with the present invention.

The device described in this patent application is depicted in FIG. 1. Item No. 1 is the GNSS module, together with the GNSS antenna.

Item No. 2 is the UWB positioning portable tag, as described in patent application no. GB1605186.4 of StatSports International.

Item No. 3 is the devices microcontroller that performs the calculations for augmenting the GNSS data with the UWB data.

Item No. 4 is a kinematics device, like a 9DoF sensor (combination of 3 axes accelerometer, 3 axes gyroscope, and 3 axes magnetometer), providing kinematics data that helps in defining the short term position of the device as "dead reckoning" when other positioning data is not available, or it serves as a short term verification for the data received from other sources.

Item No. 5 is the host system, in the form of but not limited to, a micro-controller, micro-processor, computer, or data storage system. The host system preferably provides the management functions like start, stop, reset, and the power supply functions, like standard power during functioning, backup power during stand-by, etc.

In some embodiments, the microcontroller of the UWB positioning tag can provide the functions needed for the augmentation of the data.

In some embodiments, the microcontroller of the GNSS module can provide the functions needed for the augmentation of the data.

In some embodiments, there could be a single microcontroller providing all the computing functions on the device, including the augmentation of the data.

Figure 2:
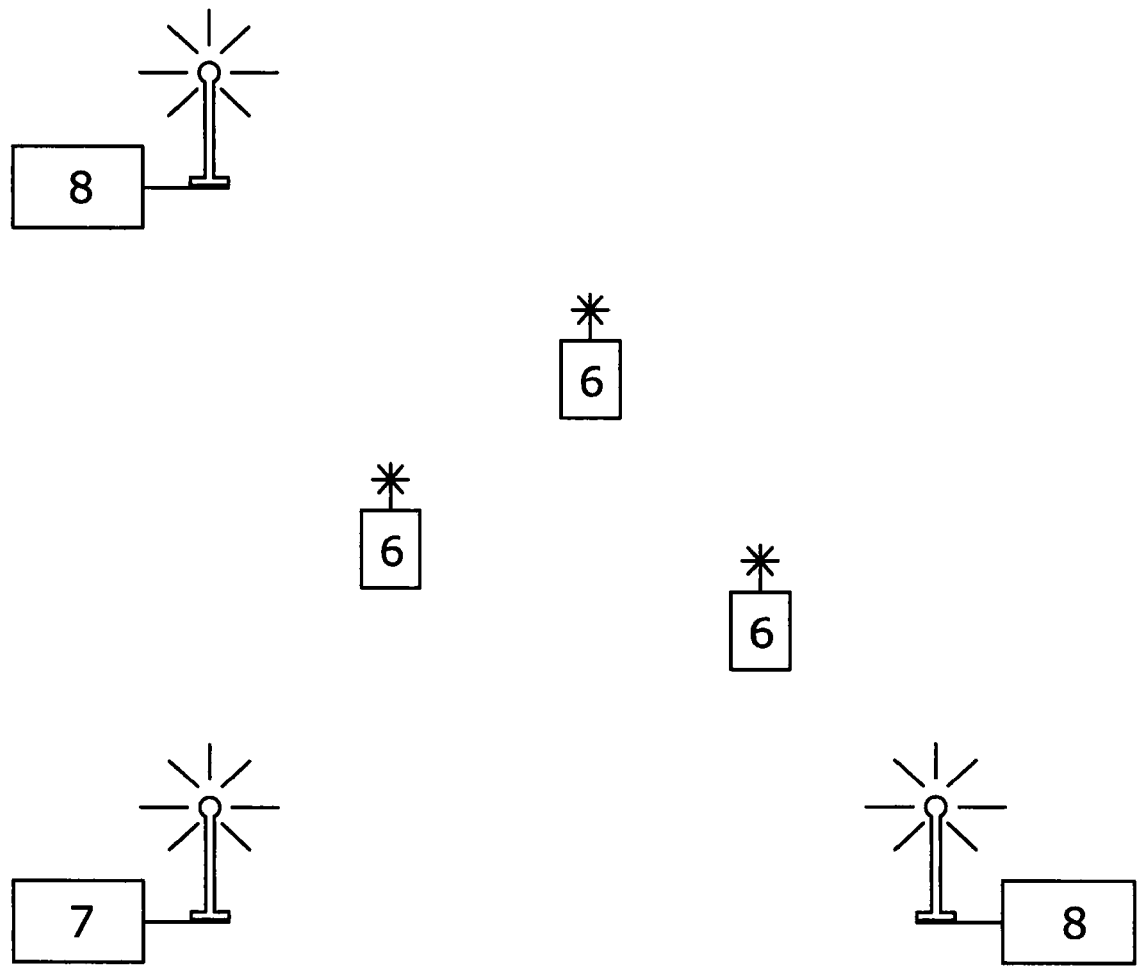
FIG. 2 is a schematic diagram of a UWB positioning system which may be used in a system in accordance with the present invention.

The device is working in an environment marked by a system of UWB beacons, as described in patent application GB1605186.4 from StatSports International, and depicted in FIG. 2. The described device is item no 6, while the environment beacons are marked 7 for the main beacon and 8 for the secondary beacons. Other beaconing systems can be used.

The data augmentation process is performed in the described device as per the process described in the flow diagram 21 of FIG. 3. The system waits for a time tick to pass 23 in an idle state, usually for a fraction of a second, corresponding to the time division necessary to obtain a desired data refresh rate, usually 10, 15, 18, 20, 25 or 50 times per second, so the time tick is $1/10$, $1/15$, $1/18$, $1/20$, $1/25$, or, respectively $1/50$ of a second. Then, it checks if any data was received from the GNSS device 25, 27, 29, and if that data is correct via integrity checks against integrated error correction checksum 31, 33, validity and credibility checks against the previously validated data extrapolated with the dead-reckoning data 35 computed using the kinematics sensor information. If the positional data is validated this way, it is presented to the host system, and the device returns to the idle state. The positional data validated this way will be used for validation in the next cycle of position acquiring.

In case the GNSS positional information is not valid, the UWB position information is checked 37 and used in a similar manner: integrity checks against integrated error correction checksum, validity and credibility checks against the previously validated data extrapolated with the dead-reckoning data computed using the kinematics sensor information 39. If the positional data is validated this way, it is presented to the host system, and the device returns to the idle state, to wait for a new cycle. The positional data validated this way will be used for validation in the next cycle of position acquiring.

In case both GNSS information and UWB information are not valid, dead-reckoning data is computed using the kinematics sensor information 41, it is presented to the host system, and the device returns to the idle state, to wait for a new cycle. The positional data validated this way will be used for validation in the next cycle of position acquiring.

The augmentation system uses the GNSS data for the calibration of the pitch or the data communicated on the data channel from the beacons, in order to calibrate and align the relative UWB positional data with the GNSS data.

A simple set of translation and rotational matrixes can be used for the calculation, as the deviation from the plane is minimal for the dimensions over the system will work (on average 100×100 m). The device constructed on the basis of these assumptions needs to be small enough and enough power efficient in order to replace a GNSS module. The dimensions will be bigger than the included GNSS module, but the added accuracy and reliability of the data will fully justify the increased dimensions and power necessity.

Improvements and modifications may be incorporated herein without deviating from the scope of the invention.

The invention claimed is:
1. A system for measuring the position of one or more object in an area of interest, the system comprising:
  an ultra wideband (UWB) position measurement system comprising
    a plurality of beacons which are each located in separate fixed positions with respect to the area of interest; and
    one or more portable tag which is attachable to the object; and
  a Global Navigation Satellite System (GNSS);
  wherein the portable tag comprises:

an ultra wideband receiver which receives UWB data for determining the UWB position of the portable tag with reference to tho primary and secondary beacons;

a GNSS receiver which receives GNSS data for determining the GNSS position of the portable tag with reference to GNSS system satellites;

a kinematics module which creates kinematics data to determine movement of the tag based upon kinematic changes in the tag; and a processor which comprises a data augmentation module which calculates position data which represents the most valid position for the portable tag as between the UWB position, the GNSS position and the movement of the tag as calculated by the kinematics module wherein the data augmentation module comprises an algorithm which:

receives GNSS data, UWB data or no data, checks the data integrity and validates the GNSS Data using UWB data and kinematics data or validates the UWB data using kinematics data and where no data is received, uses previous valid position data and kinematics data such that in each case, position data which represents the most valid position of the portable tag is calculated.

2. The system as claimed in claim 1 wherein, the data integrity check comprises one or more of:

checks against integrated error correction checksum, validity and credibility checks against the validated GNSS and UWB data extrapolated with dead-reckoning data computed using the kinematics sensor information.

3. The system in claim 1 wherein, the processor which has the data augmentation module is a microcontroller which calculates the UWB position of the portable tag.

4. The system as claimed in claim 1 wherein, the processor which has the data augmentation module is a microcontroller which calculates the GNSS position of the portable tag.

5. The system as claimed in claim 1 wherein, the processor which has the data augmentation module comprises a microcontroller which calculates the UWB position of the portable tag and which calculates the GNSS position of the portable tag.

6. The system as claimed in claim 1 wherein, the position data is communicated in binary or ASCII (American Standard Code for Information Interchange) form to a host system represented by a device that uses the position data and auxiliary data provided by the data augmentation module.

7. The system as claimed in claim 1 wherein the host provides management and supply to the data augmentation module which comprises functions including start, stop, reset, and the power supply functions, su-Ghas including standard power during functioning, backup power during stand-by.

8. The system as claimed in claim 7 wherein, the host comprises, a micro-controller, a computer, or a storage system.

9. The system as claimed in claim 1 wherein position data is transmitted as NMEA (National Marine Electronics Association) sentences, identical to the sentences generated by a GNSS module, such that the system can directly replace a GNSS module but provide more accurate and reliable data.

10. The system as claimed in claim 1 wherein, the ultra wideband position measurement system comprising a primary beacon located at a first fixed position in or near the area of interest, and two or more secondary beacons located at different fixed positions in or near the area of interest.

11. The system as claimed in claim 1 wherein, the kinematics module provides kinematics data that defines the position of the tag at the data refresh rate in the absence of valid UWB or GNSS data.

12. The system as claimed in claim 1 wherein, the kinematics module comprises a combination of 3 axis accelerometer, 3 axis gyroscope, and 3 axis magnetometer.

13. A portable tag configured for use in the system of claim 1.

14. A method for measuring the position of one or more object in an area of interest, the object being attached to a portable tag, the method comprising the steps of:

creating UWB position data which is a measure of the position of the portable tag using an ultra wideband position measurement system creating GNSS data which is a measure of the position of the portable tag using a global navigation satellite system;

creating kinematics data which is a measure of the change in position of the portable tag;

calculating position data which represents the most valid position for the portable tag based upon the UWB position data, the GNSS position data and the kinematic data.

15. The method as claimed in claim 14 wherein, the step of calculating position data comprises:

receiving GNSS data, UWB data or no data, checking the data integrity and validating the GNSS data using UWB data and kinematics data or validating the UWB data using kinematics data and where no data is received, uses previous valid position data and kinematics data such that in each case, position data which represents the most valid position of the portable tag is calculated.

16. The method as claimed in claim 14 wherein, the data integrity check comprises one or more of checks against integrated error correction checksum, validity and credibility checks against the validated GNSS and UWB data extrapolated with dead-reckoning data computed using the kinematics sensor information.

17. The method as claimed in claim 16 wherein, the kinematics data defines a position of the tag at a data refresh rate in the absence of valid UWB or GNSS data.

18. The method as claimed in claims 14 wherein, position data is communicated in binary or ASCII form to a host system.

19. The method as claimed in claim 18 wherein the host provides management and supply to the data augmentation module which provides functions including start, stop, reset, and the power supply functions, including standard power during functioning, backup power during stand-by.

20. The method as claimed in claim 19 wherein position data can be transmitted as NMEA sentences, identical to the sentences generated by a GNSS module, such as that the tag can directly replace a GNSS module.

* * * * *